United States Patent [19]

Simpson et al.

[11] Patent Number: 5,349,036
[45] Date of Patent: Sep. 20, 1994

[54] AMPHIPATHIC COPOLYMER PIGMENT DISPERSANTS

[75] Inventors: Michael A. D. Simpson, Burham; Trevor S. B. Sayer, Wokingham, both of England

[73] Assignee: Imperial Chemical Industries PLC, London, England

[21] Appl. No.: 48,227

[22] Filed: Apr. 16, 1993

[30] Foreign Application Priority Data

Apr. 21, 1992 [GB] United Kingdom ............ 9208535

[51] Int. Cl.$^5$ .......................................... C08F 220/20
[52] U.S. Cl. ..................... 526/320; 526/317.1; 526/318.4; 526/318.42; 526/329; 526/329.2; 526/333; 526/347; 526/910; 526/932
[58] Field of Search ............ 526/320, 910, 932, 329.2, 526/318.42

[56] References Cited

U.S. PATENT DOCUMENTS

| | | | |
|---|---|---|---|
| 4,165,418 | 8/1979 | Spearman | 525/377 |
| 4,170,582 | 10/1979 | Mori | 524/531 |
| 4,211,664 | 7/1980 | Dixon | 252/62.54 |
| 4,390,658 | 6/1983 | Graetz | 524/512 |

*Primary Examiner*—Fred Zitomer
*Attorney, Agent, or Firm*—Thomas M. Schmitz

[57] ABSTRACT

An amphipathic co-polymer having a weight average molecular weight of from 2,500 to 20,000 inclusive and comprising an addition polymer backbone and at least one $C_{1-4}$ alkoxy polyethylene or polyethylene copropylene glycol acrylate or methacrylate stabilizer unit where the backbone comprises up to 30% by weight of non-functional structural units and at least 70% by weight in total of stabilizer units and functional units where the functional units are optionally substituted styrene-containing units, hydroxy group-containing units and carboxyl group containing units, such that the proportions of hydroxy groups to carboxyl groups to styrene groups to propylene-oxy or ethylene-oxy groups are respectively 1 : 0.10–26.1; 0.28–25.0; 0.80–66.1.

14 Claims, No Drawings

AMPHIPATHIC COPOLYMER PIGMENT DISPERSANTS

This invention relates to certain novel co-polymers having amphipathic character that are useful as pigment dispersants, and to their preparation and use.

An amphipathic co-polymer is one that has a hydrophobic and hydrophilic character.

The amphipathic co-polymers of this invention belong to the structural class known as "combs" or "comb co-polymers". Such co-polymers consist of an addition polymer back-bone, which provides the hydrophobic character and a number of alkoxy or hydroxy terminated polyoxyalkylene groups which extend from the back bone and provide the hydrophilic character. The particular utility of comb co-polymers depends upon their molecular weight, the identity of the polyoxyalkylene groups and the presence or absence of any other functional groups on the back-bone.

Various comb co-polymers are known. For example EP-A-0011806 of the Dow Chemical Company discloses an aqueous emulsion co-polymer of: A: 15–60 weight percent based on total monomers of at least one $C_3$–$C_8$ $\alpha$, $\beta$-ethylenically unsaturated carboxylic acid monomer of the formula:

where R is H and R' is H, $C_1$–$C_4$ alkyl, or —CH$_2$COOX;
R is —COOX and R' is H or —CH$_2$COOX; or
R is $CH_3$ and R' is H; and
X is H or $C_1$–$C_4$ alkyl;

B: 15–80 weight percent of at least one non-ionic, copolyrmerizable $C_2$–$C_{12}$ $\alpha$, $\beta$-ethylenically unsaturated monomer of the formula:

$$CH_2=CYZ \qquad (II)$$

where Y is H and Z is —COOR, —$C_6H_4R'$, CN, Cl,
Y is $CH_3$ and Z is —COOR, —$C_6H_4R'$, CN or —CH=$CH_2$; or
Y and Z are Cl; and
R is $C_1$–$C_8$ alkyl or $C_2$–$C_8$ hydroxyalkyl;
R' is H, Cl, Br, or $C_1$–$C_4$ alkyl; and
R" is $C_1$–$C_8$ alkyl; and C: 1–30 weight percent based on total monomers of at least one non-ionic vinyl surfactant ester of the formula:
where R is H or $CH_3$, each R' is $C_1$–$C_2$ alkyl,
R" is $C_8$–$C_{20}$ alkyl or $C_8$–$C_6$ alkylphenyl,
n is an average number from about 6–100 and m is an average nunsher from about 0–50 provided that n≧m and Σ (n+m) is about 6–100;

said polymer being stable as an aqueous colloidal dispersion at a pH lower than about 5.0 but becoming an effective thickener for aqueous systems upon adjustment to a pH of 5.5–10.5 or higher.

The compounds disclosed here are pH responsive thickeners for water-borne systems and especially latex paints. EP-A-0011806 is regarded in the paint art as a key publication because it is one of the first patent application to be published relating to thickeners known as associative thickeners.

EP-A-0157928 Dia Nippon Ink and Chemicals Inc. is concerned with aqueous dispersions of vinyl co-polymer resins. The co-polymer resins are obtained by the polymerisation of 1 to 15 parts by weight of a polyoxyalkylene-containing hydrophilic polymerisable vinyl monomer of which the polyoxyalkylene moiety has an average molecular weight of 1,500 to 15,000 and 99 to 85 parts by weight of another potymerisable vinyl monomer.

The concept of the invention disclosed in EP-A-0157928 is to produce self-stabilizing film forming resins for emulsion paints. One of the most important components of a paint is the film-forming resin. This resin is responsible for the performance characteristics (i.e. toughness, mar-resistance and weather resistance) and appearance (i.e. gloss and surface characteristics) of the applied film. Physically drying film formers as described ill EP-A-0157928 are designed to have a relatively high molecular weight and to be able to coalesce to a film when the liquid carrier for the paint evaporates. The resins disclosed will have a molecular weight of more than 100,000. Assuming a structure where each molecule of co-polymer contains at least one polyoxyalkylene moiety to confer stability, then for the smallest such moiety of molecular weight 1,500 present at 1% by weight, the molecular weight of the co-polymer as a whole must be 150,000. When present at 15% by weight, the molecular weight of the co-polymer must be of the order of 140,000.

The resins described in EP-A-0157928 are unusual in that as compared with other film-forming resins for aqueous systems, they are self-stabilizing and do not require an emulsifier or a protective colloid to produce a stable dispersion. Moreover, these resins have superior film-forming ability and possess coatability and a gloss finish comparable with solvent-based resins. Such film properties were unusual for water-borne resins at the date of this application.

A related, albeit older film-forming resin system is disclosed in U.S. Pat. No. 4170582 of Mori et al, also from Dia Nippon Ink and Chemicals Inc. This resin system is based on polyoxyalkyleneacrylate and methacrylate stabilizers, hydroxyalkyl acrylates and methacrylates and optionally another ethylenically unsaturated monomer. These film-formers are intended for use with curing agents. They are unusual in that they have low viscosity and high solids and also have good mechanical and storage stability.

Another water-borne paint system based on a comb co-polymer is described in Chemical Abstracts Vol 91 1979Abstract No. 91:58804K. Here, the comb co-polymer is based on polyethyleneglycol (meth)acrylate and various other unsaturated monomers including hydroxyalkyl(meth)acrylate, acrylic acid, itaconic acid or crotonic acid and $C_{1-4}$ alkyl esters of acrylic or methacrylic acid. These paints are aerosol based paints and are said to have drying times of 30 to 35 mins with good gloss and adhesion.

In contrast to these water-borne thickeners and resin systems described above, GB-A-974,473 discloses a further family of comb co-polymers that are also based on ethylenic addition polymers with polyoxyalkylene side chains. These compounds are oil soluble and have detergent properties.

This brief review of the art illustrates the broad range of uses to which comb co-polymers can be put and how their utility is dependant upon their molecular weight, the identity of the polyoxyalkylene side chains and other features of structure.

References more relevant to the present invention are EP-A-0395243 of Imperial Chemical Industries and EP-A-0028886 of Dulux Australia Ltd. The former is concerned with certain comb dispersants useful for dispersing inorganic particulate material. The latter, which is the most pertinent prior art concerns comb dispersants used to disperse pigment.

Pigments for paints can be organic or inorganic and can have charged or neutral surfaces, that is the surface can be polar or non-polar. The role of a pigment dispersant is to attach to the surface of a pigment particle and keep it colloidally stabilised in the liquid paint.

Known pigment dispersants and especially the comb dispersants disclosed in EP-B-0028,886 tend to be able to associate with and disperse only a limited number of pigments depending on their polarities. Relatively non-polar pigments for example Hostaperm Red-Violet ER02 and Paliogen Red L3910 are relatively easy to disperse but more polar pigments for example Sicotrans Red L2817 and much less polar pigments for example Heliogen Blue L7101F are very much more difficult to deal with.

This presents the paint formulator designing of an otherwise standard range of paints (for example in the production of a range for motor vehicle manufacture or in a mixing scheme for industrial or domestic use) with having to use a different dispersant or blend of dispersants for each combination of pigments so as to produce a range of colours having the necessary storage stability. The problem becomes particularly acute when the paint manufacturer needs to provide paints of very close technical specification but in a large number of colours. For this purpose, a broad spectrum dispersant is called for that is capable of dispersing organic and inorganic pigments with charged or neutral surfaces.

We have now discovered a new class of co-polymer dispersants that contain alkoxypolyethylene or ethylene copropylene glycol stabilizing units, and styrene, hydroxy and carboxyl groups. These co-polymers are capable of dispersing a broader range of pigments than comparable dispersants described in EP-B-0028,886.

Accordingly the present invention provides an amphipathic co-polymer having a weight average molecular weight of 2,500 to 20,000 inclusive and comprising an addition polymer backbone and at least one $C_{1-4}$ alkoxypolyethylene or polyethylene copropylene glycol acrylate or methacrylate stabilizer unit where the back-bone comprises up to 30% by weight of nonfunctional structural units, and at least 70% by weight in total of stabilising units and functional units, where the functional units are optionally substituted styrene-containing units, hydroxy group-containing units, and carboxyl group-containing units, such that the molar proportions of hydroxy groups to carboxyl groups to styrene to ethyleneoxy or propyleneoxy groups are respectively 1:0.1–26.1; 0.28–25.0: 0.80–66.1.

Weight average molecular weight for the co-polymers of the invention can be determined by Gel Permeation Chromatography (GPC) using polystyrene as a standard in tetrahydrofuran as solvent. Alternatively it can be measured by light scattering using an OTSUCA DLS 700 apparatus.

Generally the weight average molecular weight of the co-polymer is in the range 20,000 to 2,500. For example the molecular weight can be up to 15,000. More usually it will be greater than 7,000 for example it can be between 12,000 to 7,000 or 12,000 to 8,000.

Examples of non-functional structural units are $C_{1-4}$ alkyl acrylate and methacrylate esters for example methyl acrylate, ethyl acrylate, propyl acrylate and butyl acrylate, methyl methacrylate, ethyl methacrylate, propyl methacrylate and butyl methacrylate.

The co-polymer can contain amounts of such monomers up to 30% by weight of the total polymer. Usually they will contain maximum amounts of 25%, 15% or 10% by weight. In practice they will contain a maximum of 5% by weight. Preferably they will contain no non-functional structural units, that is the co-polymer will consist of stabilizer and functional units only.

The stabilizer units forming part of the co-polymers of the invention are $C_{1-4}$ alkoxy polyethylene or polyethylene copropylene glycol acrylate or methacrylate.

Examples of $C_{1-4}$ alkoxy groups are methoxy, ethoxy, propoxy and butoxy. Preferably the alkoxy group is methoxy.

The polyethylene glycol contains repeat ethyleneoxy groups.

The polyethylene copropylene glycol contains both ethyleneoxy and propyleneoxy groups.

The molecular weight of the stabilizer unit is from 250 to 3,000. The polyethylene and polyethylene copropylene glycols from which these stabilizer units are formed are commercially available. The molecular weights referred to here are those used in commerce and by their manufacturers and are weight averages.

Preferably the stabilizer is a methoxypolyethylene glycol. Preferably the polyethylene glycol has a molecular weight from 350 to 2550. In particular it can be 350 to 2,000. Particular polyethylene glycol units have molecular weights of 2000, 1000, 750, 550 or 350.

Preferably the stabilizer unit is a methacrylate.

The functional units are optionally substituted styrene-containing units, hydroxy containing units and carboxyl group-containing units. At least some of the carboxyl groups can be in the form of carboxylate salts. Such salts are formed with ammonia, organic amines for example mono-, di- and tri $C_{1-6}$ alkylamines and mono-, di- and tri-hydroxy $C_{2-6}$ alkanolamines, and metal ions for example alkali metal cations in particular sodium and potassium. Examples of degrees of neutralisation are 100% or more usually 0 to 70% or 0 to 50%.

Substituted styrenes are of course vinyl benzenes where the benzene ring bears a substituent. Examples of such substituents are $C_{1-4}$ alkyl, particular methyl, or halogen, for example fluorine or chlorine. In particular this functional group is unsubstituted or is substituted with a methyl group. Preferably it is unsubstituted.

Hydroxy containing units can be derived from ring opening of ethylenically unsaturated epoxy monomers for example glycidyl methacrylate and ethylene unsaturated hydroxyesters particularly hydroxy-$C_{2-4}$-alkyl acrylates and methacrylate.

Examples of hydroxy-$C_{2-4}$-alkyl groups are 2-hydroxy-ethyl, 2-hydroxypropyl, 3-hydroxpropyl, 3-hydroxybutyl, 4-hydroxybut-2-yl and 1-hydroxbut-2-yl. A particular such group is 3- hydroxyprop-2-yl.

Preferably the unit is derived from 3-hydroxyprop-2-yl methacrylate also referred to colloquially as hydroxy isopropyl methacrylate.

The carboxyl group-containing unit can be derived from ethylenically unsaturated mono- and di-functional acids and di-functional acid anhydrides which are subsequently hydrolysed.

Examples of mono functional acids from which the carboxyl group-containing unit can be derived include acrylic and methacrylic acid.

Examples of di-functional acids from which the carboxyl group-containing units of this invention can be derived include maleic acid, fumaric acid and iraconic acid and their anhydrides.

Preferably the unit is derived from methacrylic acid.

One preferable class of co-polymer within the scope of this invention is that where the polyethylene glycol part of the stabilizer units has a molecular weight of 2,000 and a molar ratio of hydroxy to carboxyl to styrene to ethyleneoxy of 1:0.4–4.5; 2.5–4.5; 4.0–7.5. This class of co-polymer includes two subclasses of co-polymer.

One such subclass of co-polymers within the scope of this invention is that where the polyethylene glycol part of the stabilizer unit has a molecular weight of 2,000 and a molar ratio of hydroxy to carboxyl to styrene to ethyleneoxy of 1:0.4–2.0; 3.0–4.5; 5.0–7.0.

The other subclass of co-polymers within the scope of this invention is that where the polyethylene glycol part of the stabilizer unit has a molecular weight of 1,000 and a molar ratio of hydroxy to carboxyl to styrene to ethyleneoxy of 1:1.5–2.0; 2.5–4.0; 4.0–7.5.

Another class of co-polymers of this invention is one containing relatively higher molar proportions of methoxypolyethylene glycol stabilizer units. Within this class of co-polymer, the polyethylene glycol part of the stabilizer can have a molecular weight of 350 to 2000 inclusive and the proportion of hydroxy to carboxyl to styrene to ethyleneoxy is 1:4–5; 5–6; 40–60.

The co-polymers of the invention can be prepared by a process which comprises polymerising, in solution or dispersion, a $C_{1-4}$ alkoxypolyethylene glycol or polyethyleneoxy coproplyene glycol acrylate or methacrylate with ethylenically unsaturated monomers capable of supplying the structural units and functional units in question.

Examples of monomers capable of supplying structural and functional units have been discussed above.

When carried out in solution, the process will employ an inert organic liquid medium. Inert organic liquid media are liquid media that act as solvents for the reagents and which do not react to any significant degree with the reagents or products.

Examples are $C_{1-6}$ alkanols and $C_{3-6}$ ketones.

Examples of $C_{1-6}$ alkanols are propanol, butanol and pentanol.

Examples of $C_{3-6}$ ketones are acetone and methylethylketone.

The process can also be carried out in dispersion. Generally the dispersion will be in the form of an aqueous emulsion. The monomers are maintained in dispersion by conventional surfactants. These can be ionic or non-ionic. Examples are nonyl phenol-ethylene oxides or alcohol ethoxylates. Especially suitable are alkali metal salts of long chain acids for example sodium bis tridecyl sulphosuccinate and its alkyl analogues.

The process is preferably carried out with an initiator. Examples are butylperoxyl-2-ethyl hexanoate, $2^1,2^1$-azo bis(2-methyl butyronitrile), tertiary butyl-isopropyl percarbonate, ascorbic acid with hydrogen peroxide, tertiary butyl hydrogen peroxide with sodium meta bi-sulphite and ammonium persulphate. The initiator in question is selected depending upon the particular monomers being polymerised, the solubility of the initiator in the liquid medium and the temperature at which the process is carried out.

The overall molecular weight of the co-polymer can be controlled by chain transfer agents. Examples are alkyl thiols especially $C_{5-20}$ alkyl thiols particularly octan-1-thiol.

The reaction can be carried out at moderate temperatures. The reaction temperature will depend upon the reactivity of the monomers employed, the initiator and the liquid medium for the reaction. Where the reaction is carried out in organic liquid media, the temperature can be for example 70° to 130° C. particularly 90° to 110° C. In some cases, the reaction temperature can be controlled conveniently by carrying out the reaction at the reflux temperature of the liquid medium. Where the reaction is carried out in water, the temperature is generally in the range of 50° to 95° C.

Preferably also the reaction is carried out under an inert atmosphere for example under nitrogen.

When the reaction has been carried out in an organic medium, the organic medium can be converted into a partially or wholly aqueous medium by standard techniques. For example where the polymer and the organic medium are insoluble in water, the mixture can be emulsified under shear. Alternatively, enough of the carboxyl group can be converted into carboxylate salts to render it water miscible and the mixture in the organic medium can be diluted with water. Such salts can be prepared by standard techniques. Equally the organic medium can be removed for example by distillation and replaced with water.

Where the organic medium is water soluble, the mixture can be diluted with water or the organic liquid can be replaced, at least in part, by azeotropic distillation or steam distillation.

Co-polymers of the invention can be converted into carboxylate salts by reacting the co-polymer in solution with a solution of an appropriate base. For convenience this conversion can be carried out at moderate temperatures up to 80° C.

The co-polymers of the present invention can be used as pigment dispersants for use in pigmented waterborne coating compositions and intermediates for such compositions.

Examples of such coating compositions from vehicle painting are basecoats, clearcoats and one coat topcoats. The clearcoats and one coat topcoats can be either physically drying or two component curing systems. Examples from domestic and architectural painting include waterborne gloss paints, mid-sheen paints and matt emulsions. Other examples are primers, surfacers and undercoats for either automotive or domestic and architectural use.

Examples of paint intermediates include single pigment paints that form components or mixing basics used in automotive respray mixing schemes and pigment concentrates and tinters used in mixing schemes for domestic and architectural paints.

Waterborne coating compositions comprise an aqueous dispersion or solution of film-forming resin, pigment, and other components for example extenders, rheological control agents, crosslinking agents, plasticisers, metallic flake, pearlescent particles (especially mica), and a liquid carrier that is predominantly or exclusively water. Single pigment paints are formulated in the same way. Pigment concentrates and tinters comprise a dispersion of pigment in water with a dispersant of the invention and optionally mixing auxiliaries, humectants and flow aids to improve flow properties and mixing characteristics.

The coating compositions are made by mixing a dispersion or solution of film-former and other ingredients with a dispersion of pigment stabilized in aqueous media by a pigment dispersant of the invention. The concentrates and tinters are made by standard methods, that is by dispersing the pigment in water and adding any of the optional ingredients.

The following Examples 1 to 27 illustrate the invention. Example 28 is comparative.

EXAMPLE 1

A mixture of styrene (23.75 g), hydroxyisopropyl methacrylate (10.62 g), methacrylic acid (10.62 g), $2^1,2^1$-azo bis (2-methyl butyronitrile) (1.50 g) and tertiary butyl isopropyl percarbonate (0.6 g) was added drop wise at a uniform rate to a refluxing solution of methoxy polyethylene glycol 2000 methacrylate (20 g) and octan-1-thiol (1.5 g) in n-butanol (30.16 g) under an inert atmosphere.

Heating under reflux was continued for 1 hr and a solution of butylperoxyl-2-ethyl hexanoate (0.12 g) in butanol (0.5 g) was added to the reaction mixture. After a further 0.5 hr heating under reflux a further solution of butylperoxyl-2-ethyl hexanoate (0.12 g) in butanol (0.5 g) was added, heating under reflux was continued for a further 0.5 hr and the reaction mixture was cooled to yield a solution of co-polymer.

60 parts of water were added to the cooling vessel and 40 parts of co-polymer solution were added to the stirring water. Shear was applied during the mixing process to produce the final product—an emulsion with a non volatile content of 26%.

The co-polymer of Example 2 - Example 18 were made by analogy with the method described in Example 1 using the monomers set out in Table 1 below.

In the Tables below the abbreviations have the following meanings:

HIPMA : hydroxy isopropyl methacrylate
MAA : methacrylic acid
2-EHA : 2-ethylhexyl acrylate
MeOPEG (2000) MA methoxy polyethylene glycol 2000 methacrylate, in this and the other methoxy polyethylene glycol methacrylates, the number in brackets means the molecular weight of the polyethylene glycol.

In Tables 1 and 2 below, the amounts in moles are given sufficient to prepare 1kg of product. The molar amount in the MeOPEGMA column is the number of moles of methoxypolyethylene glycol methacrylate. The number of ethyleneoxy units (from which the number of moles of ethyleneoxy can be calculated) per polyethylene glycol is given in the table below.

| PEG Molecular Weight | Ethyleneoxy Units |
| --- | --- |
| 2000 | 45 |
| 1000 | 23 |
| 750 | 17 |
| 550 | 12.5 |
| 350 | 8 |

TABLE 1

| EXAMPLE NO. | STYRENE wt %/moles | HIPMA wt %/moles | MAA wt %/moles | MeOPEG (2000)MA wt %/moles | OHV mg KOH/g | AV mg KOH/g |
| --- | --- | --- | --- | --- | --- | --- |
| NO. 2 | 30.39/2.92 | 16.34/1.14 | 16.34/1.9 | 36.92/0.17 | 64 | 106 |
| NO. 3 | 36.54/3.51 | 16.34/1.14 | 16.34 1.9 | 30.77/0.15 | 64 | 106 |
| NO. 4 | 44.23/4.25 | 16.34/1.14 | 16.34/1.9 | 23.08/0.11 | 64 | 106 |
| NO. 5 | 38.18/3.67 | 16.34/1.14 | 14.71/1.71 | 30.77/0.15 | 64 | 96 |
| NO. 6 | 39.81/3.83 | 16.34/1.14 | 13.07/1.52 | 30.77/0.15 | 64 | 85 |
| NO. 7 | 41.44/3.99 | 16.34/1.14 | 11.44/1.33 | 30.77/0.15 | 64 | 75 |
| NO. 8 | 43.15/4.15 | 16.37/1.14 | 9.67/1.12 | 30.82/0.15 | 64 | 63 |
| NO. 9 | 44.71/4.30 | 16.34/1.13 | 8.17/0.95 | 30.77/0.15 | 64 | 53 |
| NO. 10 | 46.43/4.47 | 16.32/1.13 | 6.53/0.76 | 30.72/0.15 | 64 | 43 |
| NO. 11 | 48.07/4.62 | 16.32/1.13 | 4.89/0.57 | 30.72/0.15 | 64 | 32 |

| EXAMPLE | MMA wt %/moles | STYRENE wt %/moles | HIPMA wt %/moles | MAA wt %/moles | MeOPEG (2000)MA wt %/moles |
| --- | --- | --- | --- | --- | --- |
| NO. 12 | 29.49/2.95 | 14.74/1.42 | 16.34/1.14 | 16.34/1.90 | 23.07/0.11 |
| NO. 13 | 22.12/2.21 | 22.12/2.13 | 16.34/1.14 | 16.34/1.90 | 23.07/0.11 |
| NO. 14 | 14.74/1.47 | 29.49/2.84 | 16.34/1.14 | 16.34/1.90 | 23.07/0.11 |
| NO. 15 | 12.20/1.22 | 24.40/2.35 | 16.3/1.13 | 16.3/1.90 | 30.77/0.15 |
| NO. 16 | 24.40/2.44 | 12.20/1.17 | 16.3/1.13 | 16.3/1.90 | 30.77/0.15 |

| EXAMPLE | STYRENE wt %/moles | HIPMA wt %/moles | MAA wt %/moles | MeOPEG (1000)MA wt %/moles |
| --- | --- | --- | --- | --- |
| NO. 17 | 36.53/3.51 | 16.3/1.13 | 16.3/1.90 | 30.77/0.28 |
| NO. 18 | 30.38/2.92 | 16.3/1.13 | 16.3/1.90 | 36.92/0.34 |

EXAMPLE 19

A mixture of styrene (106.9 g), hydroxyisopropyl methacrylate (26.4 g), methacrylic acid (67.3), octan-1-thiol (13.2 g) 2',2'-azo bis (2- methyl butyronitrile) (13.2 g) and methyl ethyl ketone (88.4 g) were added at a uniform rate over a period of 2 hrs to a refluxing solution of methylethyl ketone (514.6 g) and methoxypolyethylene glycol 2000 methacrylate (467.3 g). Reflux was continued for 1 hr and a solution of 2',2' azo bis (2- methyl butyronitrile) (1.3 g) and methyl ethyl ketone (10 g) was added. Heating under reflux was continued for a further 2 hrs and further solution of 2',2' azo bis (2- methyl butyronitrile) (1.3 g) and methylethyl ketone (10 g) was added and reflux was continued for a further 2 hrs. This resulted in a clear methylethyl ketone solution. The polymer was steam distilled to remove the solvent.

The resulting polymer was neutralised to 70% degree of neutralisation (relative to methacrylic acid charge) using 10% aqueous sodium hydroxide. The non-volatile content was adjusted to 40% solids.

The co-polymer of Example 20 - Example 24 were made by analogy with the method in Example 19 using the monomers set out in Table 2 below:

TABLE 2

| STYRENE | HIPMA | MAA | MeOPEG (2000)MA |
| --- | --- | --- | --- |

TABLE 2-continued

| EXAMPLE | wt %/moles | wt %/moles | wt %/moles | wt %/moles |
|---|---|---|---|---|
| NO. 20 | 16.0/1.54 | 3.95/0.27 | 10.08/1.17 | 69.97/0.33 |
| EXAMPLE | STYRENE wt %/moles | HIPMA wt %/moles | MAA wt %/moles | MeOPEG (1000)MA wt %/moles |
| NO. 21 | 16.0/1.54 | 3.95/0.27 | 10.08/1.17 | 69.97/0.63 |
| EXAMPLE | STYRENE wt %/moles | HIPMA wt %/moles | MAA wt %/moles | MeOPEG (750)MA wt %/moles |
| NO. 22 | 16.0/1.54 | 3.95/0.27 | 10.07/1.17 | 69.98/0.81 |
| EXAMPLE | STYRENE wt %/moles | HIPMA wt %/moles | MAA wt %/moles | MeOPEG (550)MA wt %/moles |
| NO. 23 | 16.0/1.54 | 4.00/0.28 | 10.00/1.16 | 70.00/1.05 |
| EXAMPLE | STYRENE wt %/moles | HIPMA wt %/moles | MAA wt %/moles | MeOPEG (350)MA wt %/moles |
| NO. 24 | 16.0/1.54 | 3.95/0.27 | 10.08/1.17 | 69.97/1.50 |

EXAMPLE 25

Styrene (13.89 g), hydroxyisopropyl methacrylate (5.733 g), methacrylic acid (4.580 g) and sodium bi-stridecyl sulphosuccinate (0.700 g) were mixed together. 5% of this mixture (1.245 g) was added to octan-1-thiol (0.75 g), demineralised water (50.891 g) and to a solution of methoxy polyethylene glycol 2000 methacrylate (60% non volatile in water, 17.98 g) under nitrogen atmosphere. The temperature was raised to 60° C.

An aqueous solution of ascorbic acid (0.0062 g) was added and the temperature was maintained at 60° C. for ten minutes when hydrogen peroxide (0.0125 g) was added to the reacting mixture. After a further 0.5 hr the remainder of the styrene, hyroxyisopropyl methacrylate, methacrylic acid and sodium bis tri-decyl sulphosuccinate mixture was added at a uniform rate over 3 hrs. Concurrent with this addition an aqueous solution of ascorbic acid (0.0387 g) and hydrogen peroxide (0.0775 g) were added to the reaction mixture.

After a further 0.5 hr where the temperature was maintained and stirring was continued, a final addition of aqueous solution of ascorbic acid (0.005 g) followed by the final addition of hydrogen peroxide (0,010 g) was made. The temperature was maintained for a 0.5 hr and then the reaction was allowed to cool to room temperature. As the product cooled tertiary butyl hydrogen peroxide (0.1 g) was added at 50° C. and sodium metabisulphite (0.1 g) was added at 40° C. to give the final product.

EXAMPLE 26

An aqueous-butanol solution of methoxy polyethylene glycol methacrylic and octan-1-thiol was prepared by mixing aqueous methoxy polyethylene glycol 2000 methacrylate solution (12.94 g; 60% solids) with butanol (10.56 g) distilling off a portion (5.13 g) of water and butanol at reduced pressure and adding a portion (0.58 g) of octan-1-thiol A mixture of styrene (12.71 g), hydroxyisopropyl methacrylate (4.14 g), methacrylic acid (1.24 g), 2',2'-azo bis (2-methyl butyronitrile) (0.58 g) and tertiary butyl isopropyl percarbonate (0.93 g) was added drop wise at a uniform rate to the solution of methoxy polyethylene glycol 2000 methacrylate and octan-1-thiol prepared as described above under reflux and in an inert atmosphere.

Heating under reflux was continued for 3 hrs and a solution of butylperoxyl-2-ethyl hexanoate (0.06 g) in butanol (0.12 g) was added to the reaction mixture. After a further 0.5 hr heating under a reflux a further solution of butylperoxyl-2-ethyl hexanoate (0.06 g) in butanol (0.12 g) was added, hearing under reflux was continued for a further 0.5 hr.

Thereafter, a further portion of the aqueous reaction medium was diluted with the butanol distillate obtained above. Optionally, the resulting solution can be emulsified with demineralised water (40.97 g) and any aqueous distillate produced above.

EXAMPLE 27

A mixture of styrene (13.38 g), hydroxyisopropyl methacrylate (7.19 g), methacrylic acid (7.19 g), 2',2'-azo bis (2-methyl butyronitrile) (1.02 g) and tertiary butyl isopropyl percarbonate (0.4 g) was added drop wise at a uniform rate to a refluxing solution of methoxy polyethylene glycol 1000 methacrylate (32.47 g:50% solids in water) and octan-1-thiol (1.5 g) in butanol (3.20 g) under an inert atmosphere.

Heating under reflux was continued for 1.5 hr and a solution of butylperoxyl-2-ethyl hexanoate (0.12 g) in butanol (0.71 g) was added to the reaction mixture. After a further 0.5 hr heating under reflux a further solution of butylperoxyl 2-ethyl hexanoate (0.12 g) in butanol (0.71 g) was added, heating under reflux was continued for a further 0.5 hr and the reaction mixture was cooled (80° C.)

The solution so obtained was neutralised by adding dimethylaminoethanol (6.55 g) in de-mineralised water (22.76 g) in two portions with stirring.

EXAMPLE 28 - COMPARATIVE

The pigment dispersant described in EP-B-0028886 that is closest in structure to the class described here is that found on page 4 lines 57 and 58 and comprises styrene, 2-ethylhexyl acrylate, methacrylic acid and methoxypolyethyleneglycol$_{2000}$ methacrylate in particular proportions. This known dispersant, referred to here in as Dispersant B, was synthesised and compared for performance as a pigment dispersant with the most closely related example from the present application, the dispersant of Example 20 referred to herein as Dispersant A.

PREPARATION OF DISPERSANT B

A mixture of styrene (106.9 g), 2-ethylhexylacrylate (67.3 g), methacylic acid (26.4 g) octan-1-thiol (13.2 g) 2¹2¹ azobisisobutyronitrile in methylethyl ketone (88.4 g) was added dropwise with stirring over 2 hours to a solution of methoxypolyethyleneglycol 2000 methacrylate while it was being heated under reflux.

Heating was continued for a further 1 hours and a further portion of $2^12^1$azobis(2-methylbutyronitrile) (1.3 g) was added. Heating was continued for a further 2 hours and yet a further portion of $2^12^1$azobis(2-methylbutyronitrile) (1.4 g) was added. Heating was continued for two hours or more and the organic solvent was removed by distillation at reduced pressure. The residue so obtained was taken up in water and neutralised with dilute sodium hydroxide.

| | Compositions of dispersants:- | | | | |
|---|---|---|---|---|---|
| | Styrene | 2-EHA | HIPMA | MAA | MeOPE (2000)MA |
| Dispersant A | 16 | | 3.95 | 10.08 | 69.96 |
| Dispersant B | 15.9 | 11.4 | | 3 | 69.7 |

COMPARATIVE TESTING

1. Preparation of Sicotrans Mill Bases (a) A portion of Dispersant B (3.33 g: 7.20 g at 46.3% solids) in aqueous media was added to demineralised water (27.59 g) in a standard screw topped honey jar with stirring and the stirring was continued until a clear solution was obtained. Sicotrans Red L2817 pigment (8.91 g) defoamer (0.44 g) and 2 mm steel shot (510 g) were added to the clear solution and the mixture was shaken on a mechanical shaker for 2 hrs. The mill base so obtained was filtered to remove the metal shot and used in testing.

(b) A mill base was made up exactly as described above but substituting Dispersant A (3.33 g: 7.26 g at 45.9% solids) for Dispersant B and using 27.53 g of demineralised water.

2. Preparation of Other Millbases

Millbases were made up using Heliogen Blue 7101F, Hostaperm Red-Violet ER02 and Paliogen Red L3910 by the method referred to in paragraph 1(a) above but using the following amounts of materials, in grms.

| Ingredient | | |
|---|---|---|
| Dispersant A Solution | — | 7.31 |
| Dispersant B Solution | 7.24 | — |
| Demineralised Water | 24.36 | 24.29 |
| Pigment | 8.00 | 8.00 |
| Defoamer | 0.40 | 0.40 |

3. Preparation of Paints for testing The mill bases were converted into tinted white paints and into tinted clear paints to test respectively for colour strength (by the white reduction test) and for transparency. The tinted white paint was prepared by mixing the mill base with a commercially available water-borne white paint. The tinted clear paint was made by mixing the mill base with a commercially available water-borne blending clear. The proportions used are set out below:

| | Tinted White | Clear |
|---|---|---|
| Millbase | 5.0 g | 10 g |
| White Paint | 55.19 g | |
| For Sicotrans Red | | |
| For other three pigments | 54.68 g | |
| Blending Clear | | 50 g |

Testing Schedule

The dispersants were assessed for their ability to disperse pigment by examining the two paints (one containing the known dispersant B and one containing the dispersant of the invention Dispersant A) for transparency and colour strength by visual inspection and instrumental measurement and for gloss by instrumental measurement.

1. Transparency and Colour Strength: Visual Assessment

Visual assessment of transparency was carried out by applying the two paints one to each of two glass panels and side by side to Morest Charts using a block spreader (8thou) and allowing the paints to dry in air at ambient temperature. The paint films prepared by draw-down were assessed in side by side comparisons by ten volunteers. The volunteers were asked to say which paint film was the more transparent and which had the greater colour strength.

Colour strength was assessed by applying one of each of the tinted white paints to MELINEX sheets as described above for Morest Charts and assessing the strength of the colour by side by side comparison.

| TEST | TRANSPARENCY | | COLOUR STRENGTH | |
|---|---|---|---|---|
| DISPERSANT | A | B | A | B |
| Pigment | | | | |
| Sicotrans Red L2817 | 10 | 0 | 10 | 0 |
| Hostaperm Red Violet | 0 | 10 marginal | 10 marginal | 0 |
| Heliogen Blue L7101F | 10 | 0 | 10 | 0 |
| Paliogen Red L3910 | — | — | substantially the same | |

2. Transparency : Near Infra-Red

Transparency was measured instrumentally using a Bruker IFS66 Raman spectrophotometer equipped with a tungsten lamp source and a lead sulphide detector. The glass panels prepared as described above were illuminated with infra-red light incident normal to the paint film. The transmitted light was recorded in the near infra-red region from 12,000 to 4,000 cm$^{-1}$. The percentage transmission at 7,500 cm$^{-1}$ being in the region of least interference was taken as a relative measure of transparency.

The results are shown in the summary table.

3. White Strength Reduction

White strength reduction is determined by measuring the reflectance of light over the visible region of the spectrum (400 to 700 nm) using a Zeiss spectrophotometer.

The reflectance of each tinted white paint film on MELINEX sheets prepared as described above, is measured and standard x, y and z colour co-ordinates are calculated. These are used to determine colour strength values relative to 100%. The difference in colour strengths or white reduction is expressed as a percentage increase in strength of the white reduction strength.

The results are shown in the summary table.

Discussion of results

The tests carried out demonstrate the effectiveness of the comb stabilizers in stabilizing the four selected pigments. The pigments have been selected to illustrate behaviour of the dispersants with very polar pigments, typified by Sicotrans Red L2817 iron oxide, through medium polarity organic pigments typified by Hostaperm Red-violet ER02 and Paliogen Red L3910 to non-polar Heliogen Blue L7101F.

The more effective the dispersant is at dispersing, the smaller will be the size of the pigment particles obtained. Thus for a transparent pigment, the resulting clear paints will have better transparency in visual and instrumental tests, and will have better colour strength as determined visually and as measured by the white reduction test. The paints used to carry out these tests are gloss paints. Hence the more glossy the paint, the more effective is the pigment dispersant.

Referring to Sicotrans Red, dispersant A produces a clear paint that is more transparent by eye and by near infra red, and a tinted white that has a stronger colour to the eye and produces a white strength reduction increase of 15%. These two results are supported by the Cielab colour difference measurement which shows that the dispersant A paint is deeper ($-0.71$DL) but is more red (0.74DA) and yellow (4.29DB) in the white reduction test.

Hence dispersant A is a much more effective dispersant for the pigment then dispersant B. The film is more transparent, has greater colour strength and is more glossy. The pigment is more finely divided hence it is better dispersed and stabilised.

Referring to Hostaperm Red-violet, the visual and near infra red results show that the transparency of both paint films is very similar. The visual colour strength test and the white reduction test show that colour strength is similar. That observation is confirmed by the Cielab measurement where the differences are small. Dispersant A produces a film that overall is more appealing to the eye because of the slightly better colour strength and greater red/blueness coupled with slightly better gloss.

Referring to Paliogen Red, the results here are very similar to those obtained for Hostaperm Red Violet. As Paliogen Red is an oqaque pigment, the visual transparency and near infra red test do not apply. Colour strength by eye shows no real difference. This is confirmed by the white strength reduction test and Cielab result. It is to be expected from the instrumental results that the two paint films would appear to be the same.

Dispersant A and B are equally effective with this pigment.

Referring to Hellogen Blue, visual assessment and instrumental measurements show that Dispersant A—containing film is more transparent and strongly coloured. This is confirmed by the Cielab test which shows that the paint has a more blue-green hue. Gloss levels are the same.

Dispersant A produces more finely dispersed particles than does Dispersant B and hence is a more effective dispersant at stabilising this non-polar pigment in the aqueous paint.

Overall Conclusion

A comparison of the performance of a typical dispersant from EP-B-0028886 and a comparable dispersant from the present application shows that the dispersants of the present application perform effectively in dispersing and stabilising pigments with a broader range of polarity than do those of EP-B-0028886.

SUMMARY TABLE

| DISPERSANT | PIGMENT | VISUAL TRANSPARENCY | NIR % TRANSMISSION AT 7500 CM$-1$ | STRENGTH IN WHITE REDUCTION 90/10 | COLOUR DIFFERENCE IN WHITE REDUCTION CIELAB D65 (ILLUMINANT) | | | GLOSS 60 Deg. |
|---|---|---|---|---|---|---|---|---|
| | | | | | DL | DA | DB | |
| A | SICOTRANS RED L2817 | EXCELLENT | 78 | STRONGER 16% | $-0.71$ | $+0.79$ | $+4.29$ | 69 |
| B | | VERY POOR | 54 | — | — | — | — | 16 |
| A | HOSTAPERM RED VIOLET ER02 | GOOD | 64 | SLIGHTLY STRONGER 2% | $-0.21$ | $+0.16$ | $-0.15$ | 66 |
| B | | GOOD | 65 | — | — | — | — | 63 |
| A | HELIOGEN BLUE L7101F | VERY GOOD | 58 | STRONGER 5% | $-0.40$ | $-0.35$ | $-1.0$ | 54 |
| B | | GOOD | 45 | — | — | — | — | 55 |
| A | PALIOGEN RED L3910 | OPAQUE | OPAQUE | — | $+0.39$ | $+0.43$ | $-0.08$ | 73 |
| B | | OPAQUE | OPAQUE | SLIGHTLY STRONGER 1% | — | — | — | 75 |

We claim:

1. An amphipathic co-polymer pigment dispersant having a weight average molecular weight of from 2,500 to 20,000 inclusive and comprising:
   an addition polymer backbone having at least one stabilizer unit selected from the group consisting of:
   $C_{1-4}$ alkoxy polyethylene glycol acrylate,
   $C_{1-4}$ alkoxy polyethylene glycol methacrylate,
   $C_{1-4}$ alkoxy polyethylene co-propylene acrylate ester, and
   $C_{1-4}$ alkoxy polyethylene co-propylene methacrylate ester;
   where the backbone comprises up to 30% by weight of non-functional structural units and at least 70% by weight in total of said stabilizer units and functional unit, where the functional units are:
   (a) styrene units where the styrene is substituted or unsubstituted styrene;
   (b) hydroxy group-containing units, and
   (c) carboxyl group-containing units, such that the molar proportion per one mole of hydroxy units are from 0.1 to 26.1 moles of carboxyl units, from 0.28 to 25 moles of styrene units, and from 0.8 to 66.1 moles propylene-oxy or ethylene-oxy groups, respectively.

2. A co-polymer as claimed in claim 1 and having a weight average molecular up to 15,000.

3. A co-polymer as claimed in claim 1 and having a weight average molecular weight of at least 7,000.

4. A co-polymer as claimed in claim 1 and having a weight average molecular weight in the range 12,000 to 7,000 inclusive.

5. A co-polymer as claimed in claim 1 and having a weight average molecular weight in the range 12,000 to 8,000 inclusive.

6. A co-polymer as claimed in claim 1 and containing stabilising units and functional units only.

7. A co-polymer as claimed in claim 1 where the stabilizer is a methoxypolyethylene glycol.

8. A co-polymer as claimed in claim 7 where the polyethylene glycol has a molecular weight of 250 to 3,000.

9. A co-polymer as claimed in claim 8 where the polyethylene glycol has a molecular weight of 2000.

10. A co-polymer as claimed in claim 1 where the polyethylene glycol has a molecular weight of 1000.

11. A co-polymer as claimed in claim 1 where the polyethylene glycol has a molecular weight of 750, 550 or 350.

12. A co-polymer as claimed in claim 1 where the functional units are compolymerized hydroxyisopropylmethacrylate, styrene and methacrylic acid.

13. A co-polymer as claimed in claim 1 where at least some of the carboxyl groups are in the form of carboxylate salts.

14. A pigmented waterborne coating composition or intermediate therefor including a co-polymer as claimed in claim 1.

* * * * *